March 12, 1929.  J. A. HOLLESTELLE  1,705,115
RESTRAINING DEVICE AND HOLDER
Filed Oct. 9, 1926
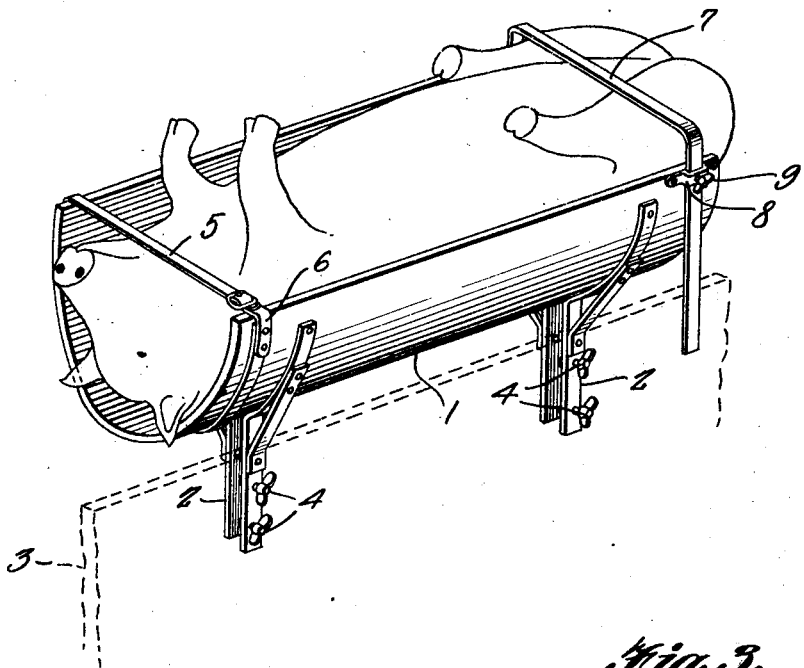
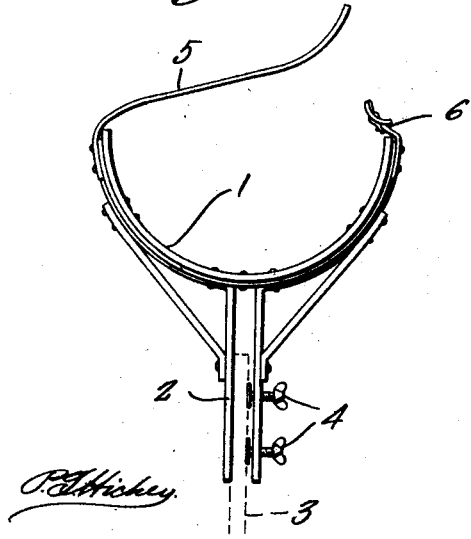
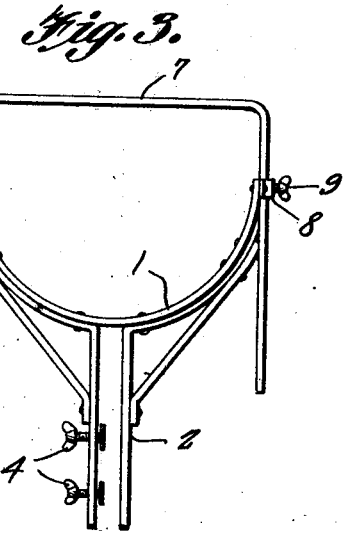
John A. Hollestelle,
INVENTOR
BY Victor J. Evans
ATTORNEY Patented Mar. 12, 1929.

1,705,115

UNITED STATES PATENT OFFICE.

JOHN A. HOLLESTELLE, OF CANOVA, SOUTH DAKOTA.

RESTRAINING DEVICE AND HOLDER.

Application filed October 9, 1926. Serial No. 140,532.

This invention relates to a holding device for an animal, the general object of the invention being to hold the animal on its back so that certain operations may be performed on the animal without the services of a second party to hold the animal, the invention being mainly designed for holding pigs.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a perspective view showing the device in use.

Figure 2 is an end view of the device.

Figure 3 is a view of the other end of the device.

In these views, 1 indicates a trough-shaped member which has fastened thereto adjacent each end a pair of straps 2 which have depending parts spaced apart so that an upright 3 can be placed between the depending parts and clamped in the space between the two by the turn screws 4 carried by one member of each pair of depending parts. A strap 5 is fastened to one edge of the member 1 adjacent one end thereof and a buckle carrying strap 6 is fastened to the other edge opposite the strap 5 so that the strap 5 can be buckled to the strap 6. A yoke-shaped member 7 is adjustably connected with the other end of the trough member 1 by means of the socket members 8 fastened to the trough and through which the limbs of the member 7 pass, turn bolts 9 being placed in the socket members to hold the member 7 in adjusted position.

The pig or other animal is placed in the trough 1 on his back and the strap 5 is buckled to the strap 6 over the head of the animal so as to hold his head in the trough. The bight of the member 7 is then pressed down upon the hind legs of the animal after they are brought close to the body and then the bolts 9 are turned to hold the member 7 in this position. The animal is thus firmly held in the device so that various operations can be performed on it.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a body of semi-circular shape in cross section with its ends open, a strap fastened to one end of the body and passing across the upper part of the same for holding an animal's head against movement, a socket member fastened to each side edge of the trough-shaped body adjacent the other end thereof, a yoke-shaped member having its limbs passing through the socket members with its bight adapted to hold the rear legs of an animal against its body, set screws in the socket members for clamping the yoke-shaped member in adjusted position, a pair of members connected with the lower part of the body adjacent each end thereof, each pair of members having depending portions spaced apart for receiving between them a supporting member and set screws in one depending part of one member of each pair for clamping the device to the supporting member.

In testimony whereof I affix my signature.

JOHN A. HOLLESTELLE.